(12) United States Patent
Kim et al.

(10) Patent No.: US 7,693,027 B2
(45) Date of Patent: Apr. 6, 2010

(54) APPARATUS AND METHOD FOR CONTROLLING RECORDING SIGNALS

(75) Inventors: Soo-Yong Kim, Suwon-si (KR); Seung-Ick Cho, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 743 days.

(21) Appl. No.: 11/514,199

(22) Filed: Sep. 1, 2006

(65) Prior Publication Data

US 2007/0053277 A1    Mar. 8, 2007

(30) Foreign Application Priority Data

Sep. 3, 2005    (KR)    ............... 10-2005-0081993

(51) Int. Cl.
*G11B 7/00* (2006.01)
(52) U.S. Cl. .................................... 369/116
(58) Field of Classification Search ............... None
See application file for complete search history.

(56) References Cited

U.S. PATENT DOCUMENTS 4,858,219 A * 8/1989 Yoshikawa ............ 369/116

FOREIGN PATENT DOCUMENTS

| JP | 62-082524 | 4/1987 |
| JP | 01-294235 | 11/1989 |
| JP | 04-356741 | 12/1992 |
| KR | 10-2005-0081993 | 11/2002 |

OTHER PUBLICATIONS

Office Action for Corresponding Korean Application No. 10-2005-0081993 dated Oct. 26, 2006.

* cited by examiner

*Primary Examiner*—Peter Vincent Agustin
*Assistant Examiner*—Aneeta Yodichkas
(74) *Attorney, Agent, or Firm*—Harness, Dickey & Pierce, P.L.C.

(57) ABSTRACT

An apparatus and method for controlling a recording signal are provided. The apparatus may include a light generator generating light used to write information to an optical disk, a light amount compensator setting a voltage level of the recording signal as a second level when the write operation is performed or stopped, and a light amount controller supplying energy to the light generator based on the second level of the recording signal until the voltage level of the recording signal reaches a first level when a rewrite operation is started and controlling the light generated by the light generator to be constant after the voltage level of the recording signal reaches the first level. The apparatus and method for controlling the recording signal may reduce write quality deterioration due to a lack of initial power of the recording signal when an optical disk recording apparatus starts a rewrite operation after stopping a write operation due to buffer underrun, insecure servo signals, wobble quality, contamination of discs, changes in recording speeds, and/or external shocks.

12 Claims, 5 Drawing Sheets

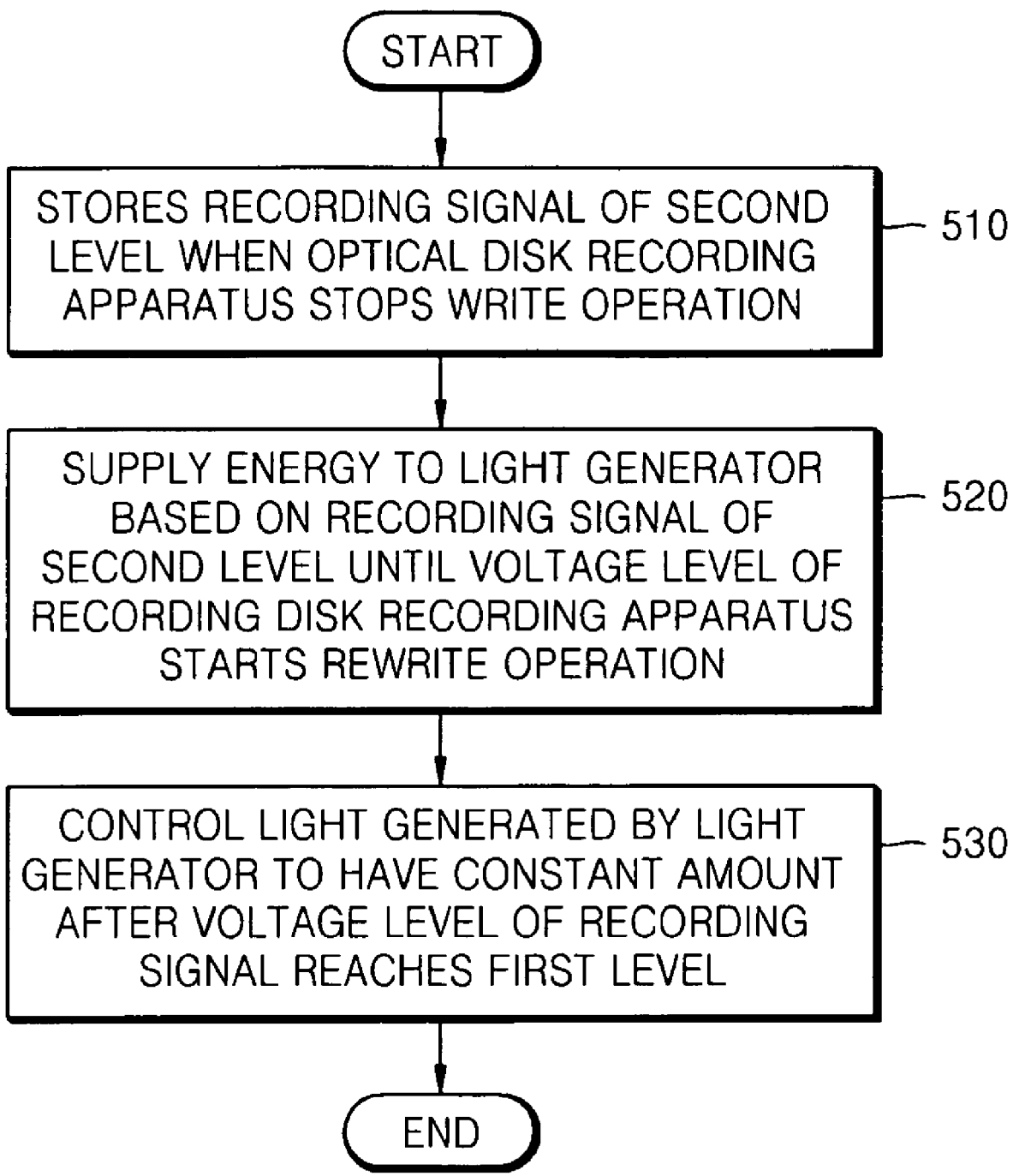

APPARATUS AND METHOD FOR CONTROLLING RECORDING SIGNALS

PRIORITY STATEMENT

This application claims the benefit of Korean Patent Application No. 10-2005-0081993, filed on Sep. 3, 2005, in the Korean Intellectual Property Office, the disclosure of which is incorporated herein in its entirety by reference.

BACKGROUND

1. Field

Example embodiments relate to an optical disc recording apparatus, for example, to an apparatus for controlling a recording signal that stabilizes a recording signal during an initial write operation, and a method of performing the same.

2. Description of the Related Art

An optical disk recording apparatus records data onto discs such as compact disc (CD), digital versatile disc (DVD), blu-disc (BD), or high definition (HD)-DVD or reproduces data recorded on such a disc.

If an optical disk recording apparatus stops writing due to buffer underrun, insecure servo signals, wobble quality, contamination, changes in recording speeds, and/or external shocks, during a write operation, normal recording results may not be obtained.

Therefore, a technique of stopping a write operation when rewriting data to disc may be employed, although the optical disk recording apparatus stops writing the data.

FIGS. 1A, 1B, and 1C are timing diagrams for explaining a method of controlling a recording signal using a conventional apparatus for controlling a recording signal.

FIG. 1A is a waveform of a write mode control signal WC indicating that an optical disk recording apparatus performs a rewrite operation after stopping a write operation.

When the optical disk recording apparatus performs a rewrite operation after stopping a write operation, it may take some time until a voltage of the recording signal reaches a stable voltage level using an automatic laser power control (ALPC) circuit.

Referring to FIG. 1B, it may take time $t_0$ until a voltage output from the ALPC circuit reaches a stable voltage level V1. Because the optical disk recording apparatus does not perform a write operation during a period of time $t_0$ due to lack of a reference voltage required to write data, data loss may occur.

To solve this problem, referring to FIG. 1C, a method of adding a DC voltage V2 with a predetermined or desired ratio to the stable voltage level V1 output from the ALPC circuit and more quickly stabilizing the reference voltage required to write the data after the write mode is controlled has been suggested.

However, such a method may cause data loss during an initial predetermined or given period of time $t_1$ after the conventional apparatus for controlling the recording signal controls the write mode. Also, because the optical disk recording apparatus may perform the write operation at a relatively high speed, the optical disk recording apparatus may write more data during the initial predetermined or given period of time $t_1$ than before, and more data loss may occur.

SUMMARY

Example embodiments provide an apparatus for controlling a recording signal that more quickly stabilizes the recording signal during an initial write operation.

Example embodiments also provide a method of controlling a recording signal that more quickly stabilizes the recording signal during an initial write operation.

According to example embodiments, there is provided an apparatus for controlling a recording signal, comprising: a light generator generating light used to write information to an optical disk; a light amount compensator setting a voltage level of the recording signal as a second level when the write operation is performed or stopped; and a light amount controller supplying energy to the light generator based on the second level of the recording signal until the voltage level of the recording signal reaches a first level after a rewrite operation is started and controlling the light generated by the light generator to be constant after the voltage level of the recording signal reaches the first level.

According to example embodiments, there is provided a method of controlling a recording signal using an optical disk recording apparatus that emits light generated by a light generator onto an optical disk and writes information on the optical disk, the method comprising: supplying energy to the light generator based on the recording signal of a second level until an amount of the light reaches a first level after the optical disk recording apparatus starts writing information to the optical disk; and controlling the light to be constant after the amount of the light reaches the first level, wherein the second level is determined by the recording signal when the optical disk recording apparatus stops writing information to the optical disk.

According to example embodiments, there is provided a method of controlling a recording signal using an optical disk recording apparatus that emits light generated by a light generator using a light generator driving circuit onto an optical disk and writes information on the optical disk, the method comprising: storing a recording signal of a second level when the optical disk recording apparatus stops a write operation; supplying energy to the light generator based on the recording signal of the second level until a voltage level of the recording signal reaches a first level after the optical disk recording apparatus starts a rewrite operation; and controlling the light generated by the light generator to be constant after the voltage level of the recording signal reaches the first level.

BRIEF DESCRIPTION OF THE DRAWINGS

The above and other features and advantages will become more apparent by describing in detail example embodiments thereof with reference to the attached drawings in which:

FIG. 5 is a flowchart illustrating a method of controlling a recording signal according to example embodiments.

DETAILED DESCRIPTION OF EXAMPLE EMBODIMENTS

Figure 1A:
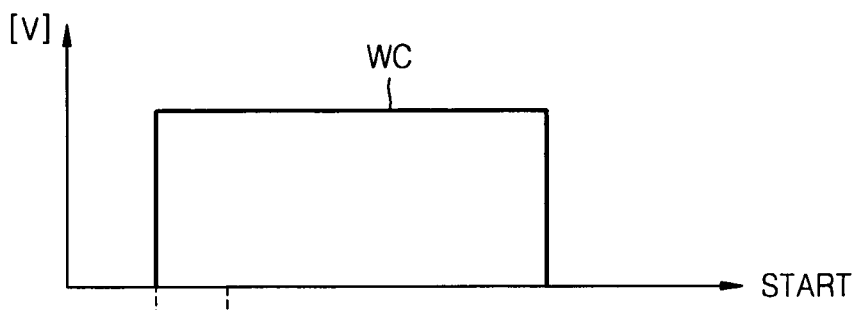
FIGS. 1A, 1B, and 1C are timing diagrams for explaining a method of controlling a recording signal using a conventional apparatus for controlling the recording signal.

Various example embodiments are described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete and will fully convey the scope of example embodiments to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, elements, components and/or groups thereof.

Example embodiments are described herein with reference to cross-section illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments relate to a method of manufacturing a capacitor and a method of manufacturing a semiconductor device using the same. Other example embodiments relate to a method of manufacturing a capacitor having improved characteristics and a method of manufacturing a semiconductor device using the same.

Figure 2:
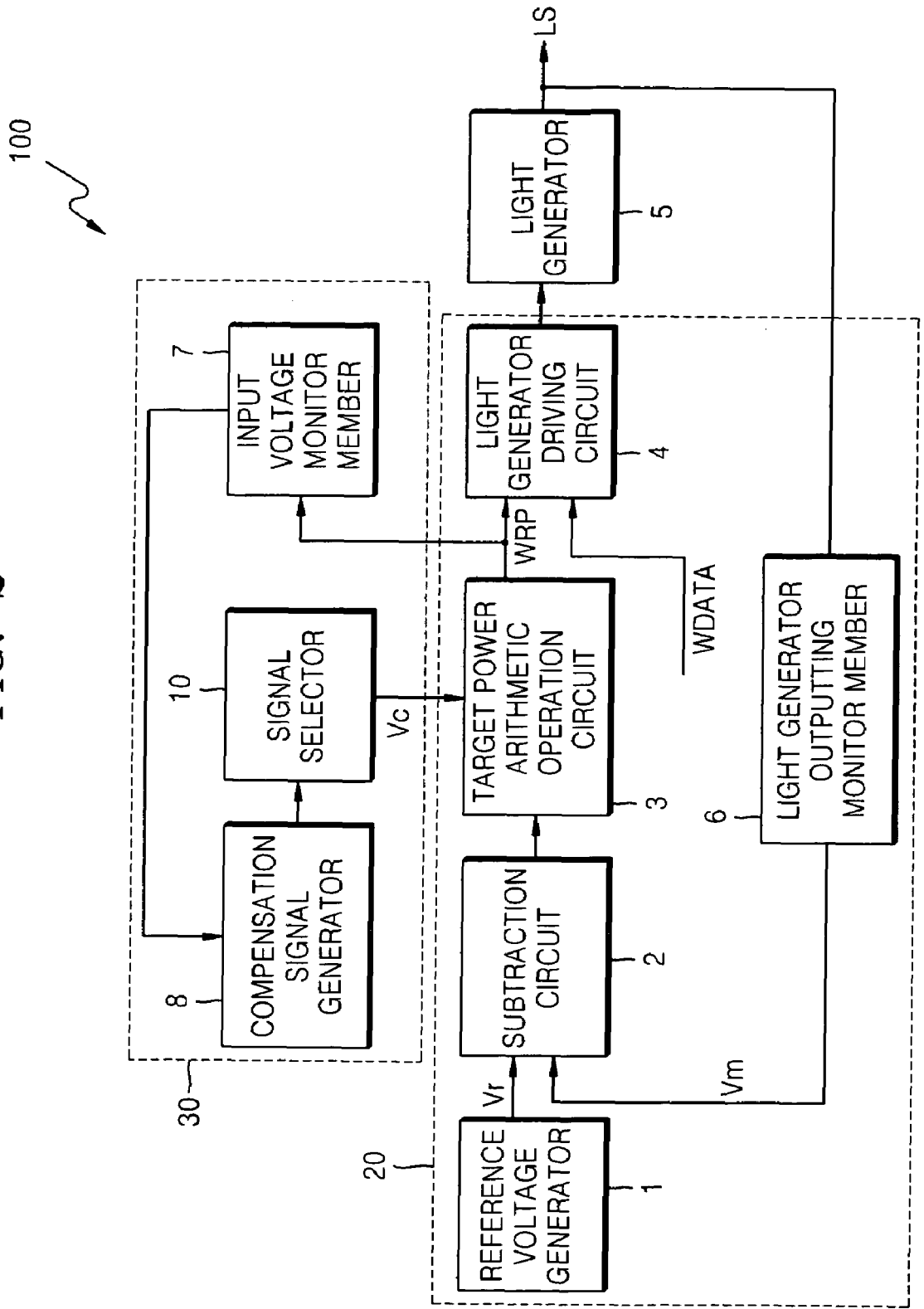
FIG. 2 is a block diagram of an apparatus for controlling a recording signal according to example embodiments.

FIG. 2 is a block diagram of an apparatus 100 for controlling a recording signal according to example embodiments. Referring to FIG. 2, the apparatus 100 for controlling the recording signal may include a light generator 5, a light amount controller 20, and/or a light amount compensator 30.

The light generator 5 may generate light for writing information on an optical disk. The light amount compensator 30 may set a voltage level of the recording signal WRP as a second level when an optical disk recording apparatus stops writing information to the optical disk. That is, the light amount compensator 30 may allow a voltage level of the recording signal WRP to quickly reach a stable level during an initial write operation.

The light amount controller 20 may supply energy to the light generator 5 based on the recording signal WRP of the second level until the voltage level of the recording signal WRP reaches a first level when the optical disk recording apparatus starts to rewrite information to the optical disk and may maintain a constant amount LS of the light generated by the light generator 5 after the voltage level of the recording signal WRP reaches the first level. That is, the light amount controller 20 may control the light generated by the light generator 5 to have a constant level LS when the optical disk recording apparatus writes information to the optical disk.

The light amount controller 20 may include a light generator outputting monitor member 6, a reference voltage generator 1, a subtraction circuit 2, a target power arithmetic operation circuit 3, and/or a light generator driving circuit 4.

The apparatus 100 for controlling the recording signal may detect the amount LS of the light generated by the light generator 5 using the light generator outputting monitor member 6.

The light generator outputting monitor member 6, which may be a light detector that detects the amount LS of the light generated by the light generator 5, may generate a monitor voltage Vm according to the detected amount LS of light. The reference voltage generator 1 may generate a reference voltage Vr according to characteristics of various disks.

The subtraction circuit 2 may subtract the monitor voltage Vm generated by the light generator outputting monitor member 6 from the reference voltage Vr generated by the reference voltage generator 1. That is, the subtraction circuit 2 may calculate a difference between the amount LS of the light generated by the light generator 5 and the reference voltage Vr and produces the difference, e.g., a result output by the subtraction, to the target power arithmetic operation circuit 3.

Operation of the target power arithmetic operation circuit 3 may depend on whether the normal write operation is performed or an initial rewrite operation is performed after the normal write operation is stopped. When the optical disk recording apparatus performs a write operation, the target power arithmetic operation circuit 3 may compensate for the recording signal WRP based on the result output by the subtraction circuit 2.

The target power arithmetic operation circuit 3 in which a previous recording signal is stored may add or subtract the result output by the subtraction circuit 2 to or from the previous recording signal to control the voltage level of the recording signal WRP to have a stable level, for example, V1.

When the optical disk recording apparatus performs an initial rewrite operation after stopping the write operation, the target power arithmetic operation circuit 3 may compensate for the recording signal WRP based on the result output by subtraction circuit 2 and a compensation signal Vc output by the light amount compensator 30.

Figure 1B:
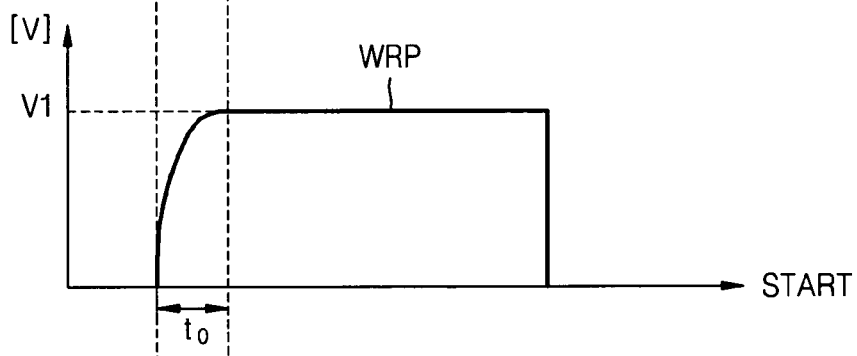

That is, the target power arithmetic operation circuit 3 may add the result output by the subtraction circuit 2 to the compensation signal Vc to control the recording signal WRP to have a stable level, for example, V1. Therefore, the smaller the difference value between the compensation signal VC of the light amount compensator 30 and the reference voltage Vr, the smaller the time $t_0$ illustrated in FIG. 1B, so that the recording signal WRP may be more quickly stabilized during an initial rewrite operation.

The light amount compensator 30 may include an input voltage monitor member 7, a compensation signal generator 8, and/or a signal selector 10.

The input voltage monitor member 7 may monitor a value output by the target power arithmetic operation circuit 3, e.g., the recording signal WRP, when the optical disk recording apparatus performs a normal write operation. When the optical disk recording apparatus stops a write operation, the input voltage monitor member 7 may supply the monitored recording signal WRP to the compensation signal generator 8 according to a control signal (not shown) of a controller (not shown).

Figure 3:
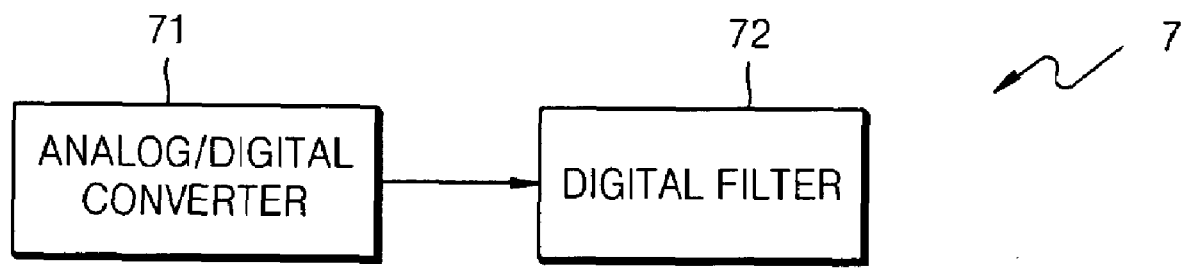
FIG. 3 is an example block diagram of an input voltage monitor member illustrated in FIG. 2.

FIG. 3 is an example block diagram of the input voltage monitor member 7 illustrated in FIG. 2. Referring to FIG. 3, the input voltage monitor member 7 may include an analog/digital converter 71 and/or a digital filter 72.

The analog/digital converter 71 may digitize the recording signal WRP. The digital filter 72 may remove unnecessary data from the digitized signal.

For example, if a predetermined or provided write mode signal WC is at a relatively high voltage level, the digital filter 72 may continue to perform an arithmetic operation because the write operation is currently performed. The digital filter 72 may hold an output value when the write mode signal WC is converted into a relatively low voltage level. The digital filter 72 may transmit the held value to the compensation signal generator 8 in a standby mode.

Therefore, the value held by the digital filter 72 is the recording signal WRP stored in the compensation signal generator 8, and is a value of the recording signal WRP when the write operation was ended. Because the recording signal WRP stored in the compensation signal generator 8 may be output as the compensation signal Vc through the signal selector 10, the compensation signal Vc may only be slightly different from the reference voltage Vr.

The signal selector 10 need not transmit the recording signal WRP stored in the compensation signal generator 8 to the target power arithmetic operation circuit 3 when the optical disk recording apparatus performs the write operation but may transmit the recording signal WRP as the compensation signal Vc during the initial rewrite operation, after the optical disk recording apparatus stops the write operation.

For example, the signal selector 10 may be an on/off switch. The on/off switch may be turned off when the write operation is performed according to the control signal (not shown) of the controller (not shown), and may be turned on during a predetermined or desired period of time after the optical disk recording apparatus starts the rewrite operation to apply the compensation signal Vc to the target power arithmetic operation circuit 3.

The target power arithmetic operation circuit 3 may add the compensation signal Vc output by the light amount compensator 30 to the result output by the subtraction circuit 2 during a predetermined or given initial period of time after the optical disk recording apparatus starts the rewrite operation. Because the compensation signal Vc is the recording signal WRP monitored when the optical disk recording apparatus stops a previous write operation, if the light generator 5 is driven using a value output by the target power arithmetic operation circuit 3, a period of time for the amount LS of the light generated by the light generator 5 to be stabilized may be reduced.

Therefore, when the optical disk recording apparatus starts a rewrite operation, data loss may be reduced due to a lack of voltage of the recording signal WRP during the period of time when the light amount controller 20 is stabilized.

After the voltage level of the recording signal WRP reaches the first level, e.g., the stabilized level, the light amount compensator 30 need not output the compensation signal Vc, and the light generator driving circuit 4 may receive the recording signal WRP generated by the target power arithmetic operation circuit 3. The light generator driving circuit 4 may convert a voltage of the received recording signal WRP into a current thereof to drive the light generator 5.

Figure 4A:
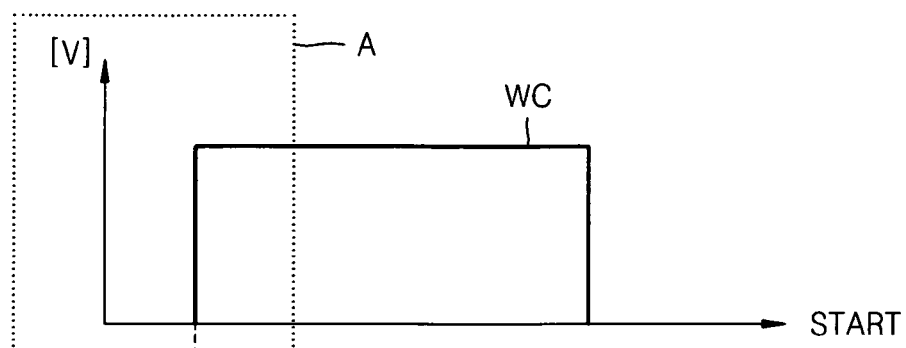
FIGS. 4A, 4B, 4C, and 4D are example timing diagrams for explaining a method of controlling a recording signal using the apparatus for controlling the recording signal illustrated in FIG. 2.
Figure 4B:
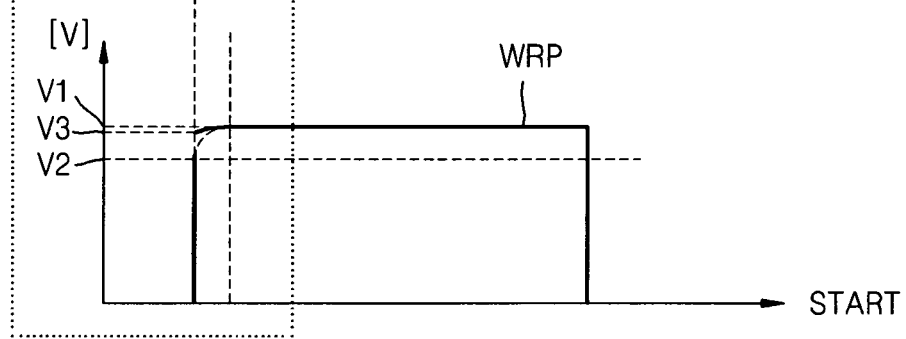
Figure 4C:
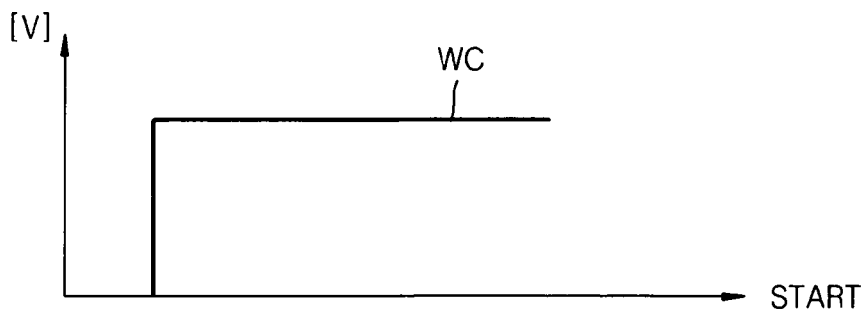
Figure 4D:
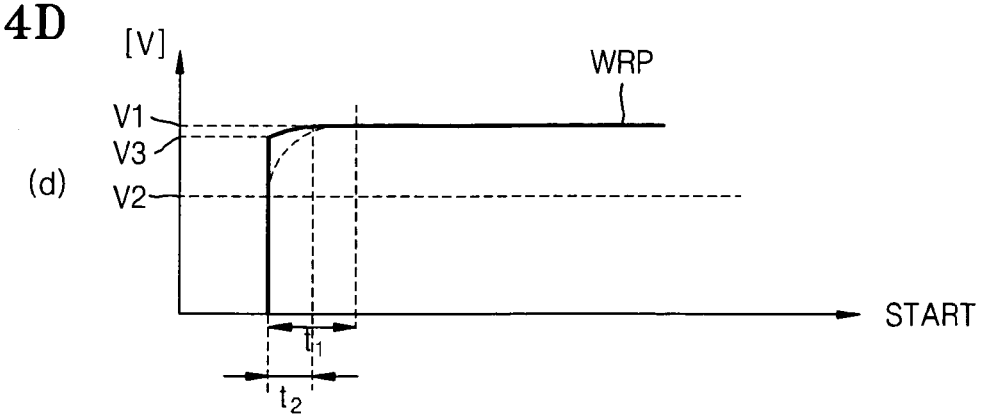

FIGS. 4A, 4B, 4C, and 4D are example timing diagrams for explaining a method of controlling a recording signal using the apparatus for controlling the recording signal illustrated in FIG. 2. FIG. 4A is an example timing diagram of a write mode control signal WC, FIG. 4B is an example timing diagram of the recording signal WRP, and FIGS. 4C and 4D are example timing diagrams of portion A shown in FIGS. 4A and 4B.

When the write mode control signal WC of FIG. 4A transitions from a lower voltage level to a higher voltage level, the optical disk recording apparatus may start a rewrite operation after stopping a write operation.

Figure 1C:
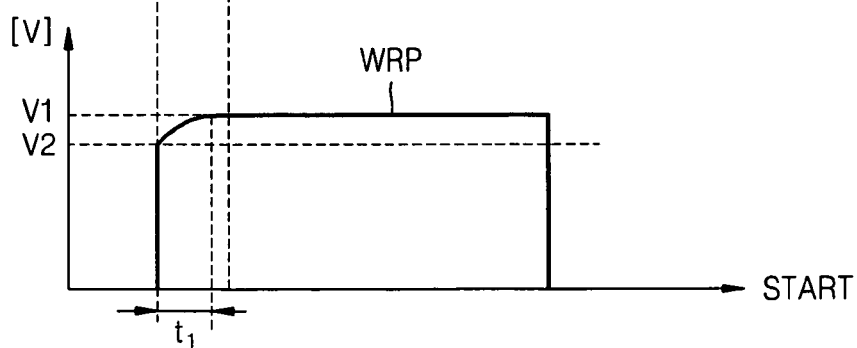

The recording signal of FIG. 4B is described with reference to FIGS. 4C and 4D. Voltage V2 may be similar to that used in the conventional art, and may be the same as the DC voltage V2 illustrated in FIG. 1C applied when the optical disk recording apparatus starts a write operation.

The DC voltage V2 may be an improved or optimized value determined in advance, for example, through experiments. The improved or optimized value may correspond to a value of 80% of a target recording signal WRP. Voltage V3 may be determined by the apparatus 100 for controlling the recording signal according to example embodiments, may indicate a voltage level of the recording signal WRP when the optical disk recording apparatus ends the write operation, and may be similar to the stable level V1 of the recording signal WRP.

Therefore, the voltage level of the recording signal WRP may move from the level V2 to the level V1 in a period of time $t_2$ faster than a period of time $t_1$ so that the optical disk recording apparatus may start the rewrite operation after ending the write operation.

A method of controlling the recording signal according to example embodiments may be employed by the optical disk recording apparatus that emits light generated by the light generator 5 onto an optical disk and writes information on the optical disk.

A method of controlling the recording signal may supply energy to the light generator 5 based on the recording signal of the second level until the amount LS of light reaches the first level after the optical disk recording apparatus starts writing information to the optical disk and may control light generated by the light generator 5 to be constant LS after the amount LS of light reaches the first level. The second level may be determined by the recording signal when the optical disk recording apparatus stops writing information to the optical disk.

An example method of controlling the recording signal will now be described with reference to FIG. 5.

FIG. 5 is a flowchart illustrating a method of controlling a recording signal according to example embodiments. Referring to FIG. 5, a method of controlling the recording signal may be employed by an optical disk recording apparatus that emits light generated by a light generator using a light generator driving circuit onto an optical disk and writes information on the optical disk.

A method of controlling the recording signal may store a recording signal of a second level when the optical disk recording apparatus stops a write operation (Operation 510), may supply energy to the light generator based on the recording signal of the second level until the voltage level of the recording signal reaches a first level after the optical disk recording apparatus starts the rewrite operation (Operation 520), and/or may control the light generated by the light generator to be constant after the voltage level of the recording signal reaches the first level (Operation 530).

Operations 510, 520, and 530 may correspond to operations of the apparatus 100 for controlling the recording signal illustrated in FIG. 2, and thus the detailed description thereof is omitted.

The apparatus and method for controlling a recording signal according to example embodiments may reduce write quality deterioration due to a lack of initial power of the recording signal when an optical disk recording apparatus starts a rewrite operation after stopping a write operation due to buffer underrun, insecure servo signals, wobble quality, contamination of discs, changes in recording speeds, and external shocks, etc.

While example embodiments have been particularly shown and described, it will be understood by those of ordinary skill in the art that various changes in form and details may be made therein without departing from the spirit and scope of the following claims.

What is claimed is:

1. An apparatus for controlling a recording signal and stabilizing the recording signal during an initial write operation, the apparatus comprising:
   a light generator generating light used to write information to an optical disk;
   a light amount compensator setting a voltage level of the recording signal as a second level when the write operation is performed or stopped; and
   a light amount controller supplying energy to the light generator based on the second level of the recording signal until the voltage level of the recording signal reaches a first level after a rewrite operation is started and controlling the light generated by the light generator to be constant after the voltage level of the recording signal reaches the first level,
   wherein the light amount compensator outputs a compensation signal and sets the voltage level of the compensation signal as the second level when the rewrite operation is started, and
   wherein the light amount controller controls the voltage level of the recording signal to reach the first level using the compensation signal output by the light amount compensator when the rewrite operation is started.

2. The apparatus of claim 1, wherein the light amount controller comprises:
   a light generator outputting monitor member generating a monitor signal indicating an amount of the light generated by the light generator;
   a reference voltage generator generating a constant reference voltage;
   a subtraction circuit producing a difference between the voltage level of the reference voltage and a voltage level of the monitor signal;
   a target power arithmetic operation circuit controlling the recording signal to reach the first level using the difference produced by the subtracting circuit and the compensation signal output of the light amount compensator; and
   a light generator driving circuit driving the light generator according to an output of the target power arithmetic operation circuit.

3. The apparatus of claim 2, wherein the light generator driving circuit receives the recording signal as a voltage.

4. The apparatus of claim 2, wherein the light amount compensator comprises:
   an input voltage monitor member monitoring the recording signal;
   a compensation signal generator storing the monitored recording signal as the second level when the write operation is stopped; and
   a signal selector determining whether to transmit the recording signal to the target power arithmetic operation circuit as the compensation signal of the second level when the rewrite operation is started.

5. The apparatus of claim 4, wherein the input voltage monitor member comprises:
   an analog/digital converter converting the recording signal into a digital signal; and
   a digital filter filtering the digital signal converted by the analog/digital converter.

6. The apparatus of claim 4, wherein the input voltage monitor member does not transmit the recording signal to the compensation signal generator during the write operation and the input voltage monitor member transmits the recording signal to the compensation signal generator when the write operation is stopped.

7. The apparatus of claim 4, wherein the signal selector transmits the compensation signal to the target power arithmetic operation circuit until an amount of the light generated by the light generator reaches the first level after the rewrite operation is started and does not transmit the compensation signal to the target power arithmetic operation circuit when the amount of the light reaches the first level.

8. A method of controlling a recording signal and of stabilizing the recording signal during an initial write operation using an optical disk recording apparatus that emits light generated by a light generator onto an optical disk and writes information on the optical disk, the method comprising:

supplying energy to the light generator based on the recording signal of a second level until an amount of the light reaches a first level after the optical disk recording apparatus starts writing information to the optical disk; and controlling the light to be constant after the amount of the light reaches the first level, wherein the second level is determined by the recording signal when the optical disk recording apparatus stops writing information to the optical disk, and wherein a voltage level of a compensation signal is set as the second level when a rewrite operation is started and a voltage level of the recording signal is controlled to reach the first level using the compensation signal when the rewrite operation is started.

9. A method of controlling a recording signal and of stabilizing the recording signal during an initial write operation using an optical disk recording apparatus that emits light generated by a light generator using a light generator driving circuit onto an optical disk and writes information on the optical disk, the method comprising:

storing a recording signal of a second level when the optical disk recording apparatus stops a write operation;

supplying energy to the light generator based on the recording signal of the second level until a voltage level of the recording signal reaches a first level after the optical disk recording apparatus starts a rewrite operation; and controlling the light generated by the light generator to be constant after the voltage level of the recording signal reaches the first level, wherein supplying energy to the light generator includes outputting a compensation signal;

setting a voltage level of the compensation signal as the second level when the rewrite operation is started, and controlling the voltage level of the recording signal to reach the first level using the compensation signal when the rewrite operation is started.

10. The method of claim 9, wherein the light generator driving circuit receives the recording signal as a voltage.

11. The method of claim 9, wherein storing the recording signal comprises:

monitoring the recording signal received by the light generator driving signal; and not storing the monitored recording signal when the optical disk recording apparatus writes information on the optical disk and storing the monitored recording signal when the optical disk recording apparatus stops writing information on the optical disk.

12. The method of claim 9, wherein controlling the light generated by the light generator comprises:

monitoring an amount of the light generated by the light generator; and controlling the light to be constant using a difference between a voltage corresponding to the monitored amount of the light and a reference voltage.

* * * * *